Patented Feb. 23, 1932

1,846,347

UNITED STATES PATENT OFFICE

HERBERT H. MEYERS, OF PITTSBURGH, PENNSYLVANIA, ASSIGNOR TO ARMOUR FERTILIZER WORKS, OF CHICAGO, ILLINOIS, A CORPORATION OF NEW JERSEY

TREATMENT OF CALCINED PHOSPHATE

No Drawing.   Application filed December 7, 1928.   Serial No. 324,586.

This invention relates to improvements in the process of manufacturing fertilizer materials.

Calcined phosphates may be prepared by sintering a mixture comprising ground phosphate-rock containing adequate silica, for example 3% or more, or with added silica if required, an alkaline metal salt, and carbonaceous material, thereby effecting a partial conversion of the phosphate, crushing such sintered mixture into porous lumps, and calcining such lumps at a sufficient temperature and for a period of time to complete the conversion of the phosphate into available phosphate. Such a method of procedure has been presented in my United States Letters Patent No. 1,578,339, for production of available phosphate, granted March 30, 1926.

In my United States Letters Patent 1,760,990, manufacture of concentrated fertilizer material, granted June 3, 1930, I have disclosed a process for treating calcined phosphate, high in ammonium citrate available, such as results from the method set forth in the preceding paragraph, with ammonia and carbon dioxide or their equivalent, ammonium carbonate, whereby the calcined phosphate is decomposed, resulting in the production of ammonium and alkali phosphates and calcium carbonate, the latter being precipitated as a solid, the phosphates remaining in solution, which is filtered off and treated in any one of a number of ways to yield ammonium phosphate, or mixed ammonium and alkali phosphates, particularly mixed ammonium and potash phosphates.

I have discovered, however, that when calcined phosphates treated in the manner described above are also mixed with certain finely-ground materials, the reaction is materially accelerated.

The added reagent may be any one of a number of materials such as country clay, plastic clays, flint clays, feldspar, green sand, alunite, aluminum oxide, etc., but, under ordinary circumstances, I prefer to employ the country clay readily available in the neighborhood where the process is practiced.

Where previously it required some little time to secure a maximum extraction, a slightly better result can now be obtained in from one to two hours less time by using one of these reagents or catalysts.

According to the new process, the finely-ground or disintegrated clay is added to the finely-ground, calcined phosphate in an amount of ten per cent. or over, by weight, of clay in relation to the calcine.

Such mixture is introduced into an autoclave, together with an excess of ammonia water or commercial ammonia liquor, and, while agitating the mixture, carbon dioxide, as the pure gas, or in the form of flue-gas, is blown into the mixture under slight pressure.

For the best results, enough carbon dioxide is introduced into the autoclave to produce normal ammonium carbonate, but an excess of carbon dioxide over this may be used.

Owing to the neutralization taking place, the mixture heats up somewhat, and it is not advisable to allow such temperature to rise very high, and agitation is continued until the mixture is cool, at least below fifty degrees to sixty degrees centigrade, or cooling methods may be employed.

At the end of the agitation period, the solution is filtered off and evaporated, with a recovery of vapors, to about 1.4 or higher specific gravity.

Then the solution is thoroughly saturated with ammonia gas to increase the ammonia content and to render the drying easier, whereupon the mass crystallizes, and is then dried quickly, recovering any ammonia vapor which is driven off.

In this manner a crystalline product is obtained from the solution analyzing about fifteen (15%) percent. to twenty (20%) percent. ammonia and approximately forty (40%) per cent. to fifty (50%) per cent. $P_2O_5$.

Another method of practicing the process comprises filtering off the solution after the agitation period ends and thoroughly washing the residual calcium carbonate to assure complete extraction, the solution then including the washing water usually amounting to at least twice the volume of the original liquid. To this liquid is added ammonia, as gas or anhydrous ammonia, until the ammonia content of the solution is about twenty (20%) per cent. or more. During, or at the end of, the addition of the ammonia, the solution should be allowed to cool to normal or room temperature and this may be accomplished, if desired, by water-cooling the reaction vessel during the period of introduction of the ammonia. By this means ninety-five (95%) per cent. to ninety-eight (98%) per cent. of the $P_2O_5$ content of the solution is precipitated as ammonium and alkali metal phosphates in crystalline form. The crystals are then separated from the solution and part of the residual solution, containing both ammonia and ammonium carbonate, is used after slight dilution for the extraction of more calcined phosphate. The remainder of the solution, which is not employed for this purpose, is stripped of its ammonia and ammonium carbonate in the usual manner and then discarded.

In practice, one hundred (100) parts of calcined phosphate have been mixed with twenty-five (25) parts of local clay obtained from the phosphate-rock field of Tennessee, and in two hours' time extractions of $P_2O_5$ from the calcine have been achieved ranging from eighty (80%) per cent. to ninety (90%) per cent.

Similar results have also been obtained by using thirteen (13) parts of clay to one hundred (100) parts of calcined phosphate, and with amounts of the previously-mentioned other materials in the same ratio.

It is possible to add clay to the calcined rock in such amounts that, if the $P_2O_5$ is sufficiently removed, the resulting residue after extraction, consisting mainly of calcium carbonate and clay, is in the right ratio to produce satisfactory Portland cement on burning.

For example, seventy-five (75) parts of calcined phosphate made from Tennessee rock were added to thirteen (13) parts of German clay containing seventy-two (72%) per cent. silica, and the mixture was treated in autoclaves for about three hours, with ammonia and carbon dioxide, and the residue was then burned to produce cement clinker, and the cement thereby produced had satisfactory properties.

If the residual $P_2O_5$, however, is too high, the cementing qualities of the final product may be more or less seriously impaired.

The solution from the treatment was treated in the manner above specified.

In introducing the solid materials into the autoclave for treatment with water, ammonia and carbon dioxide it is of little or no consequence whether the calcined material and accelerator are first mixed or whether the calcined material is added and then the accelerator or vice-versa.

I claim:

1. The process of manufacturing fertilizer materials consisting in mixing a finely-ground calcined phosphate material containing phosphate available by the ammonium citrate method with a finely-divided mineral accelerator, digesting such mixture with ammonia, water and carbon dioxide, separating the solids from the solution, and recovering the phosphates from the solution.

2. The process of manufacturing fertilizer materials consisting in mixing a finely-ground calcined phosphate material containing phosphate available by the ammonium citrate method with finely-divided clay, digesting such mixture with ammonia, water and carbon dioxide, separating the solids from the solution, and recovering the phosphates from the solution.

3. The process of manufacturing fertilizer materials consisting in mixing a finely-ground calcined phosphate material containing phosphate available by the ammonium citrate method with a finely-divided mineral accelerator, digesting such mixture with ammonia, water and carbon dioxide, separating the solids from the solution, burning and grinding said separated solids to form a cement, the accelerator being of such chemical composition and used in such amount that said separated solids when so burned and ground constitute a cement, and recovering the phosphates from said solution.

4. The process of manufacturing fertilizer materials consisting in mixing a finely-ground calcined phosphate material containing phosphate available by the ammonium citrate method with finely-divided clay, digesting such mixture with ammonia, water and carbon dioxide, separating the solids from the solution, burning and grinding said separated solids to form a cement, the clay being used in such amount that said separated solids when so burned and ground constitute a cement, and recovering the phosphates from the solution.

5. The process of manufacturing fertilizer materials consisting in mixing a finely-ground calcined phosphate material containing phosphate available by the ammonium citrate method with a finely-divided clay, digesting such mixture with ammonia, water and carbon dioxide, separating the solids from the solution, washing such solids, adding the wash water to the mother liquor, passing ammonia into such liquor to effect crystallization, and separating the crystals from the liquor.

6. The process of manufacturing fertilizer materials consisting in mixing a finely-ground calcined phosphate material containing phosphate available by the ammonium citrate method with a finely-divided clay, digesting such mixture with ammonia, water and carbon dioxide, separating the solids from the solution, washing such solids, adding the wash water to the mother liquor, passing ammonia into such liquor to effect crystallization, separating the crystals from the liquor, using part of the residual liquor in the further performance of the process, and recovering ammonia and ammonium carbonate from the liquor not so used.

In witness whereof I have hereunto set my hand.

HERBERT H. MEYERS.